United States Patent [19]

Castle

[11] Patent Number: 4,490,088
[45] Date of Patent: Dec. 25, 1984

[54] LIFTING TOOL

[76] Inventor: Alfred B. Castle, 4104 Maryland Ave., Bethesda, Md. 20816

[21] Appl. No.: 361,044

[22] Filed: Mar. 23, 1982

Related U.S. Application Data

[63] Continuation-in-part of Ser. No. 131,690, Mar. 19, 1980, Pat. No. 4,321,003.

[51] Int. Cl.³ .............................................. B62B 1/14
[52] U.S. Cl. ..................................... 414/457; 254/131
[58] Field of Search ............... 414/440, 442, 444, 457, 414/490; 254/131, 120, 84; 280/47.23, 47.24, 47.21; 294/17; 70/144

[56] References Cited

U.S. PATENT DOCUMENTS

| | | | |
|---|---|---|---|
| 458,182 | 8/1891 | Merrifield | 80/47.23 X |
| 1,681,944 | 8/1928 | Marshall | 414/457 |
| 2,433,754 | 12/1947 | Belko | 414/457 |
| 3,198,362 | 8/1965 | Berg | 414/444 |
| 3,275,299 | 9/1966 | Meshew | 414/457 X |
| 3,856,166 | 12/1974 | Gibson | 414/444 |
| 4,227,731 | 10/1980 | Castle | 294/17 |
| 4,321,003 | 3/1982 | Castle | 414/440 |

Primary Examiner—Joseph E. Valenza
Assistant Examiner—David A. Bucci
Attorney, Agent, or Firm—Murray, Whisenhunt and Ferguson

[57] ABSTRACT

Tool for vertically lifting and maneuvering objects such as utility access covers. A pair of spaced-apart ring assemblies including inner and outer concentric independently rotatable rings are connected to each other by a first connecting member which extends over the object. The object is engaged to the tool by hooks suspended from the first connecting member. The ring assemblies are also connected by a second connecting member which is spaced from the first connecting member by a distance sufficient to permit a lever to be engaged to both connecting members so that when a force is applied to the lever, both connecting members move causing simultaneous rotation of the inner rings while the outer rings remain stationary, to vertically lift the object into the space between the ring assemblies. The object while suspended between the ring assemblies is then transportable by rotation of the outer rings with respect to the inner rings.

8 Claims, 6 Drawing Figures

LIFTING TOOL

The present application is a continuation-in-part application of U.S. patent application Ser. No. 131,690 filed Mar. 19, 1980 (U.S. Pat. No. 4,321,003).

The present invention relates to a tool suitable for vertically lifting and maneuvering objects including, for example, manhole covers, gratings, and other types of utility access covers.

BACKGROUND OF THE INVENTION

It is well known that many utility installations, for example, sewer pipes, waste water pipes, electric cable conduits, mains water supply control valves, transformers and the like, are positioned below ground level. Access to these utility installations is generally achieved by climbing through an entrance hole at ground level and down a vertically extending access conduit, usually a cylindrical pipe having a diameter large enough to permit at least a person to gain access to the utility installation.

The access conduit entrance is invariably provided with a utility access cover which is usually fabricated from a rigid robust material such as cast iron or reinforced concrete and, as a result, is heavy and difficult to maneuver. Most usually, these utility access covers are fabricated from cast iron and have at least two holes near the outer circumferential edge of the cover for use in removing the cover from the entrance hole. In position, the cover is seated in a cover support ring situated such that the cover and the ring are substantially in the plane of the surrounding surface, such as that of the road or sidewalk surface. The technique usually employed for lifting and maneuvering these covers is to use a crow-bar, trap-hook, or similar metallic rod-like tool by inserting the tool into one of the holes in the cover and pulling the tool outwards and upwards towards the operator, relying on the friction between the cover and the tool to effect lifting of the cover. Alternatively, the cover may be removed by forcing it out of its supporting ring by jamming a tool between the outer peripheral edge of the cover and the support ring. In both instances, very little control over the movement of the cover can be maintained and, furthermore, there is always the chance that the cover may drop off the tool and injure the operator.

U.S. Pat. No. 4,227,731 to Alfred B. Castle, the inventor of the tool of the present application, there is disclosed a lifting tool which can be used to conveniently lift and maneuver utility access covers. The tool is especially suited for lifting and maneuvering heavy cast iron manhole covers since it is possible to maintain complete control over the movement of the cover without risk of the cover being disengaged from the tool and possibly injuring the operator. The tool described in the above-mentioned patent, the disclosure of which is specifically incorporated herein by reference, is particularly suited for lifting and maneuvering utility access covers provided with locking devices such as that described in U.S. Pat. No. 3,751,949 to Alfred B. Castle.

While the lifting tool described in the above-mentioned U.S. Pat. No. 4,227,731 works well for regular-sized circular manhole covers and small gratings, difficulties are still encountered in lifting and maneuvering larger manhole covers and gratings, in particularly those employed, for example, to cover large below-ground-level transformer housings. A major problem with these larger covers and gratings is that, in view of their increased dimensions and weight (typically in the range of 300 to 2,000 pounds, e.g., 450 to 700 pounds), it is generally necessary to employ two or more persons for the cover handling operation, which increases labor cost significantly. In addition, while it may be possible for two or more persons to lift the cover from its retaining frame without the expenditure of too much effort, moving the covers away from the frame requires care and can be dangerous, as it is necessary to walk near the edges of the frame. Loss of control of the cover in the region of the frame could result in severe damage to the utility installation if the cover falls into the installation vault as well as severe physical injury to the persons involved.

In copending application Ser. No. 131,690 (U.S. Pat. No. 4,321,003), the disclosure of which is incorporated by reference in the present application, there is described and claimed a lifting tool which is particularly suited for lifting and maneuvering utility access covers, especially large and heavy utility access covers. The lifting tool of U.S. patent application Ser. No. 131,690 comprises a ring support means for supporting the tool during lifting and maneuvering the object, the ring support means having at least two axially spaced-apart ring assemblies which are spaced-apart by a distance sufficient to permit the object to be lifted and suspended between the ring assemblies. Each ring assembly includes an inner and outer concentric ring member, each being independently rotatable with respect to the other, with the inner ring member being at least partially axially within the outer ring member. A connecting means is mounted on the inner ring members for axially connecting together the spaced-apart ring assemblies, and hooks or other object engaging means are mounted on the connecting means for liftingly engaging the tool with the object to be lifted. Lifting is effected by engaging a lever to the connecting means so that when a force is applied to the lever to move the connecting means in a generally upward direction, the inner ring members are rotated simultaneously with respect to the outer ring members which remain substantially stationary. Upon simultaneous rotation of the inner ring members, the object is vertically lifted into a raised position between the ring assemblies as the connecting means and the hooks move upwardly. With the object suspended in the raised position, the object is transportable by pulling or pushing the lever means to effect rotation of the outer ring members relative to the inner ring members. The object is lowered by moving the lever in the opposite direction to that just described, whereby the inner ring members rotate in the opposite direction and permit lowering of the suspended object back to ground level or into a receiving frame.

While the above-describing lifting tool operates very well in practice, it has been found that when the tool is used for lifting very heavy objects such as wide utility access grating covers, the connecting means extending between the two ring assemblies occasionally undergoes bending or flexing which can interfere with the vertical movement of the object, and thereby impede the lifting operation.

SUMMARY OF THE INVENTION

It has now been found, surprisingly, that the above-mentioned bending or flexing of the connecting member can be substantially eliminated, and the overall stability and rigidity of the tool can be increased, by introducing a structural modification to the tool which tends to spread and equalize the forces exerted on the connecting member and the ring assemblies. The improved lifting tool of the present invention comprises a ring support means for supporting the tool during lifting and maneuvering of the object, the ring support means having at least two axially spaced-apart ring assemblies separated by a distance sufficient to permit the object to be lifted and suspended between the ring assemblies. Each ring assembly includes an inner and outer concentric ring member, each being independently rotatable with respect to the other, with the inner ring member being at least partially axially within the outer ring member. A first connecting means is mounted on the inner ring members for axially connecting together the spaced-apart ring assemblies, and a second connecting means, spaced from the first connecting means, is also mounted on the inner ring members and axially connects together the spaced-apart ring assemblies. Object engaging means are mounted on the first connecting means for liftingly engaging the tool with the object to be lifted, and lever means are operatively engageable to the first and second connecting means so that when a force is applied to the lever means to rotate the first and second connecting means, the inner ring members are rotated simultaneously with respect to the outer ring members which remain substantially stationary. Upon simultaneous rotation of the inner members, the object is vertically lifted into a raised position between the ring assemblies as the first and second connecting means move in an arcuate path and the engaging means move in a generally upward direction. With the object suspended in the raised position, the object is transportable by pulling or pushing the lever means to effect rotation of the outer ring members relative to the inner ring members. The object is lowered by moving the lever means in the opposite to that just described, whereby the inner ring members rotate in the opposite direction and permit lowering of the suspended object back to ground level or into a receiving frame.

According to a preferred feature of the invention, it is possible to employ, as the lever means for the tool of the present invention, one or more of the tools described and claimed in the above-mentioned U.S. Pat. No. 4,227,731, with each tool being modified, as described in more detail below, to permit engagement with the first and second connecting means of the present lifting tool.

From the above, it will be seen that it is possible, using the tool of this invention, to maintain complete control of movement of the object as it is brought into the raised position between the ring assemblies and then transported by rotation of the outer rings. The lifting operation can be performed smoothly without excessive bending or flexing of either of the connecting means, and the object is securely retained on the engaging means so that there is no risk of the cover becoming disengaged from the tool and injuring the operator during lifting and maneuvering. Additional advantageous features of the present tool are its maneuverability and superior mechanical advantage which further aid in the control and safe lifting and maneuvering of the object. Thus, as the length of the lever is increased, for example, by using one of the above-mentioned tools described and claimed in U.S. Pat. No. 4,227,731, modified as described in detail below, an advantageous mechanical moment is created making lifting and maneuvering of the cover a relatively effortless operation.

For reference purposes, it is to be understood that the expression "utility access cover", as used herein, means any cover which is commonly employed to restrict access to utility installations, usually those located below ground. More particularly, this expression is intended to include circular "manhole" covers, having at least one hole located near an outer peripheral edge and extending through the top surface of the cover, gratings having parallel spaced-apart bars of rectangular cross-section and generally placed over transformer installations and the like, reinforced concrete utility covers, and any other type of cover designed to prevent entry to utility installations by unauthorized personnel.

It has also been found that the tool of this invention can be used to lift and maneuver many other diverse objects including, for example, box-shaped objects, automobile engines, luggage, carpet rolls, furniture, transformers, sewage pipes, and so forth. It will be appreciated, therefore, that the tool of the present invention is not limited to lifting and maneuvering utility access covers, and that is can be readily adapted for use in handling other objects such as those just examplified. Some specific examples of adaption of the tool for purposes other than lifting utility access covers will be described later.

BRIEF DESCRIPTION OF THE DRAWINGS

Further features and advantages of the tool of the invention will become apparent upon consideration of the following detailed description of specific embodiments, especially when taken in conjunction with the accompanying drawings, wherein.

DETAILED DESCRIPTION OF THE INVENTION

For convenience of description, in the major portion of the following discussion, reference will be made to utility access covers as the objects being lifted and maneuvered by the tool lifting invention. However, as indicated earlier, the present tool is not limited to lifting and maneuvering utility access covers, and some of the other lifting applications are described and illustrated in the parent of the present application, namely U.S. Pat. No. 4,321,003, and to avoid duplication of discussion in this regard, the entire disclosure of the parent patent is incorporated by reference in the present application.

Figure 1:
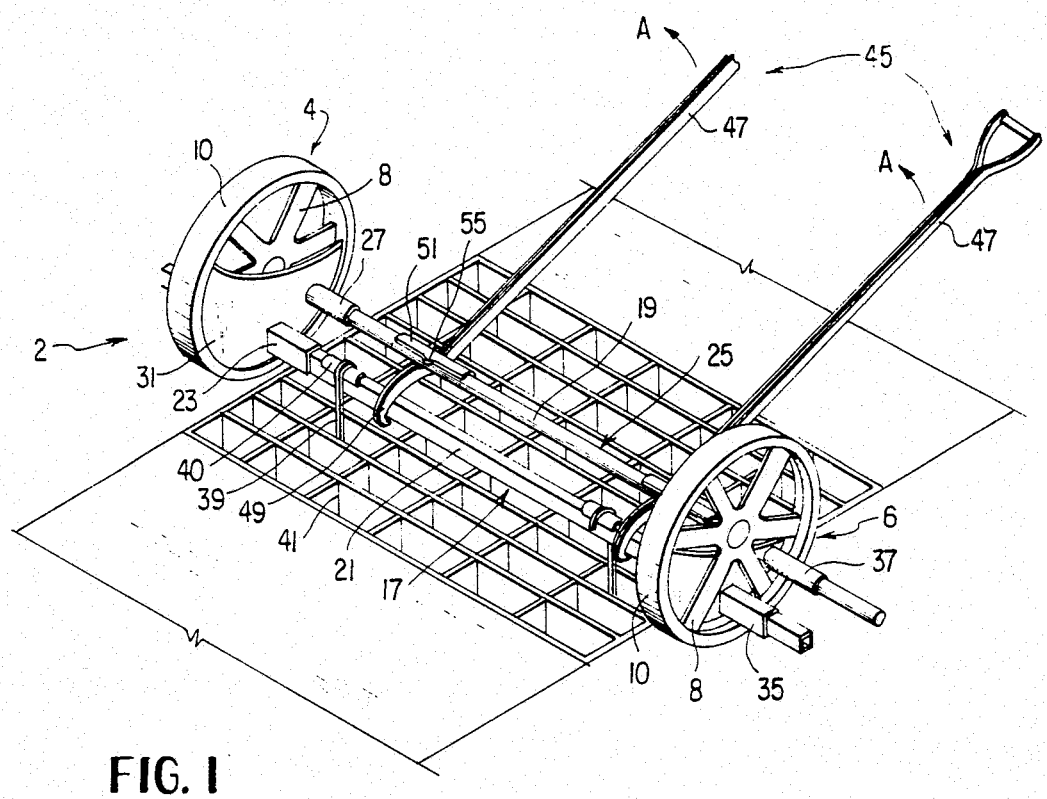
FIG. 1 is a perspective view of the tool of the invention in engagement with a utility access cover in its lowered position with tools of U.S. Pat. No. 4,227,731, suitably modified engaged as handles.
Figure 4:
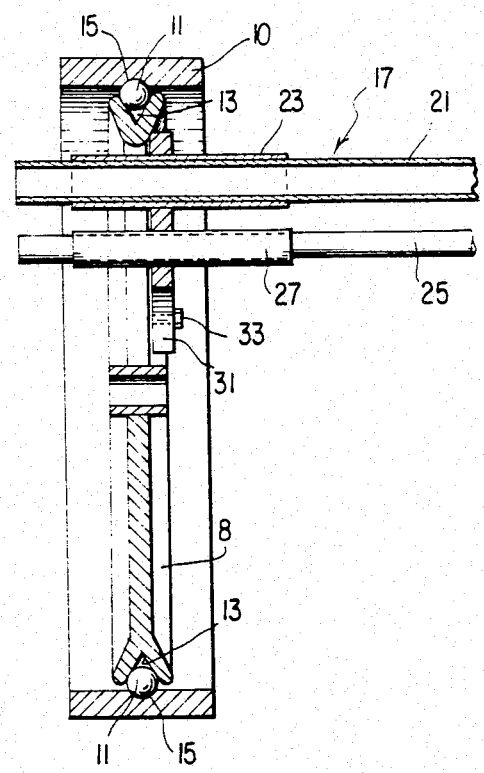
FIG. 4 is a partial cross-sectional view along the line IV—IV in FIG. 3.

Referring to FIG. 1 of the present application, there is shown the tool of the invention, generally referenced 2. The tool 2 is fabricated from metal, typically high strength steel, and comprises two axially spaced-apart ring assemblies 4,6, each including inner and outer concentric rings 8,10 which are independently rotatable with respect to each other. The inner rings 8 are at least partially axially aligned within the respective outer rings 10, and it is preferred to utilize, for each inner ring 8, a spoked sheave wheel as illustrated in the accompanying Figures. The rings 8,10 are independently rotatable by the provision of a plurality of ball bearings 11, maintained equidistant from each other by cylindrically shaped spacers 12, contained in troughs 13,15 formed respectively in the outer circumferential edge of each inner ring 8 and along the inner arcuate surfaces of each outer ring 10. This is shown more clearly in FIG. 4, discussed below.

Figure 2:
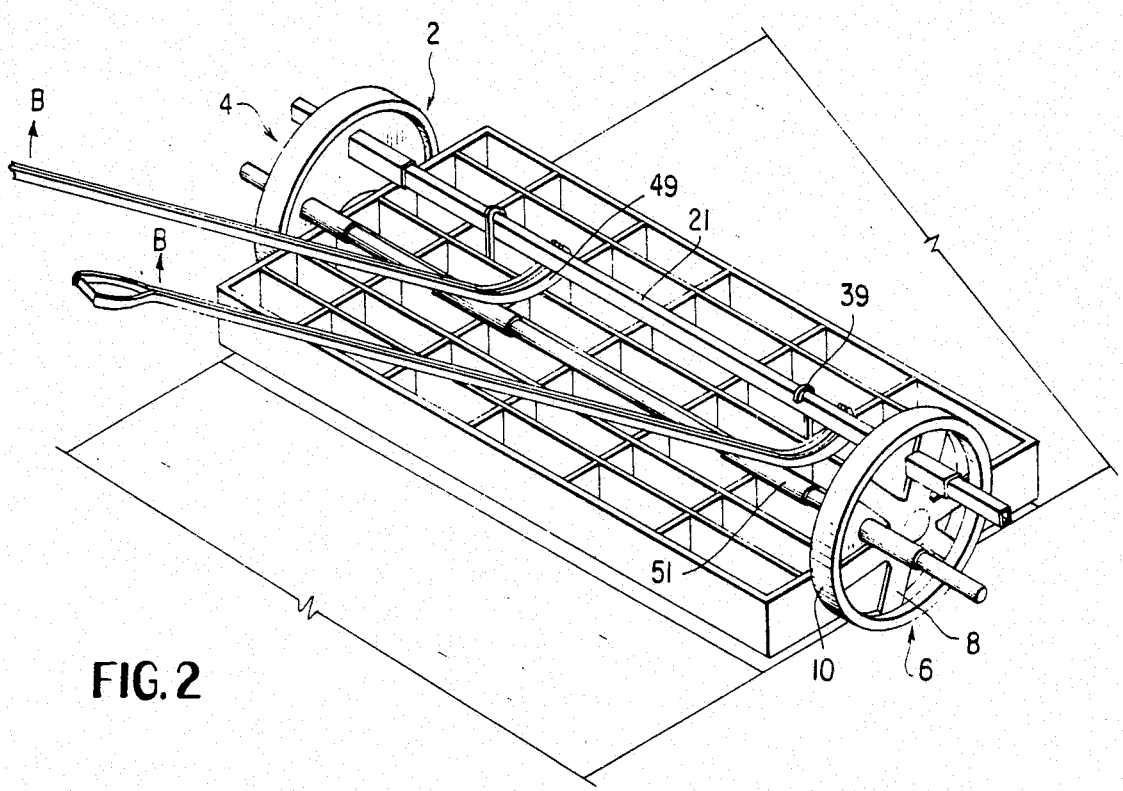
FIG. 2 is a perspective view of the tool shown in FIG. 1 with the utility access cover in the raised position.

First and second connecting means generally referenced 17,19 extend between ring assemblies 4,6 and axially connect together these ring assemblies. As illustrated in FIGS. 1 and 2, the first connecting means 17 preferably comprises a steel tube of square cross-section 21 which is received in appropriately sized axially short receiving means of square cross-section 23. While it is not critical to utilize a tube of square cross-section for the first connecting means, it is preferred to do so as this ensures simultaneous rotation of each inner ring upon movement of the connecting means 17 during operation of the tool. Thus, if a tube of circular cross-section was employed, it would be necessary to provide an additional means for keying the tube to each inner ring so that simultaneous rotation of each inner ring was achieved upon rotation of the tube, and this is unnecessary when a tube of square cross-section is utilized. The overall dimensions of the tube 21 and the receiving members 23 are not critical, but it has been found preferable in practice to employ, for the tube 21, square cross-section tubing of one inch external dimension, and square cross-section tubing of 1 and ¼ inches external dimension for the receiving members 23. When tubing material of these dimensions is employed, the tube 21 is snuggly receivable in each receiving member 23.

The second connecting means 19 comprises a solid bar of circular cross-section 25 which is receivable in an axially short pipe member 27 fixed to the inner ring. Again, the dimensions of the bar 25 and the pipe member 27 are not critical, but it has been found preferable in practice to employ steel rod having an external diameter of ¾ of inch as the bar 25, and ¾ inch pipe member as the pipe member 27 which has an internal diameter such that the bar 25 is snuggly, but moveably, receivable therein. As illustrated in the accompanying drawings, the first and second connecting means are spaced from one another, and are located on the inner ring sheave wheel such that the first and second connecting means extend through the space between respective radially extending spokes 29 of the sheave wheel.

Figure 3:
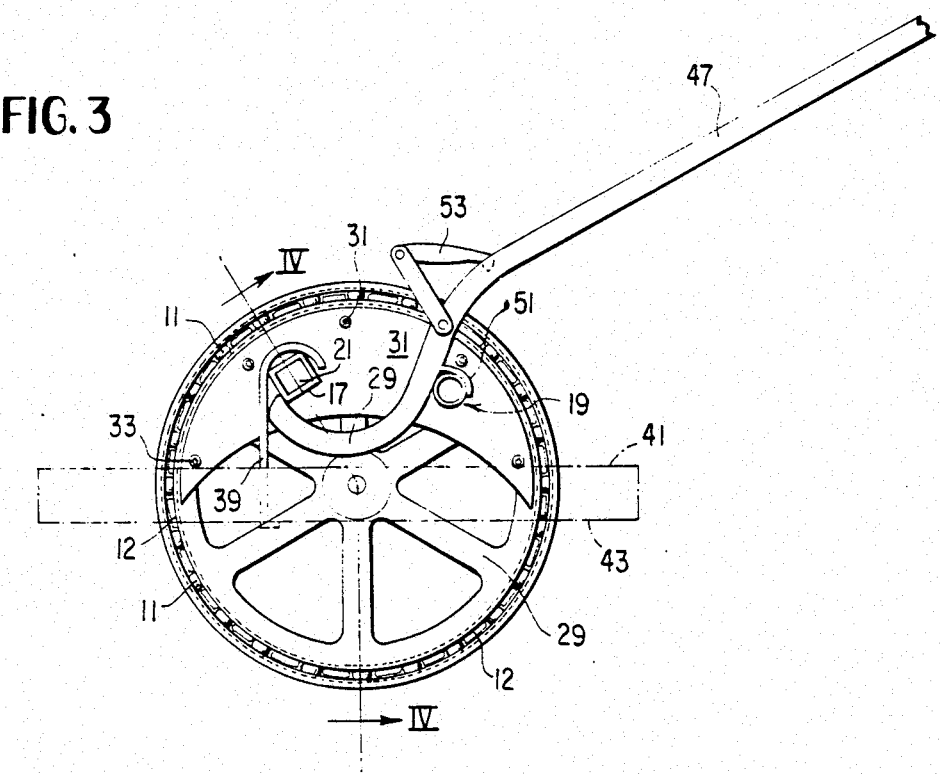
FIG. 3 is a partial side elevation showing a handle in operative engagement with the tool of the invention when the utility access cover is in the raised position.
Figure 6:
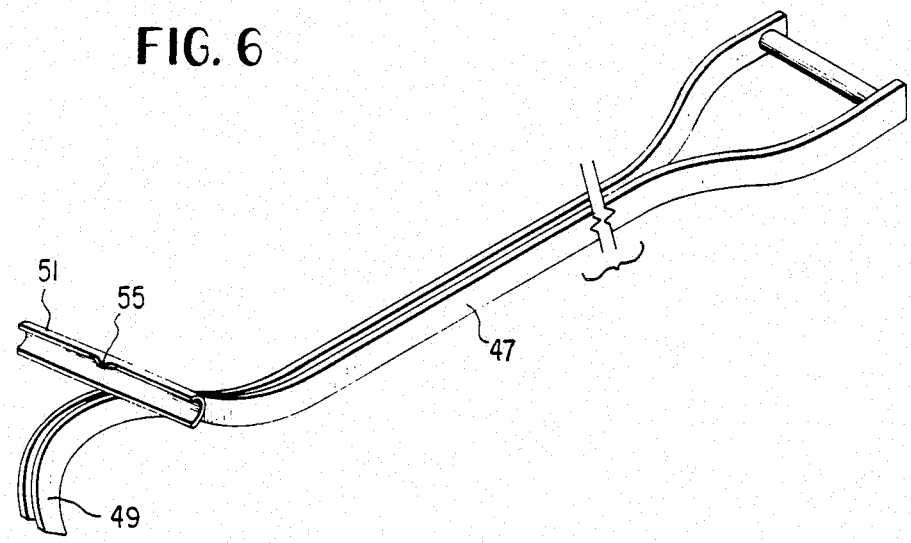
FIG. 6 is a perspective view of a handle for the tool of the invention.
Figure 5:
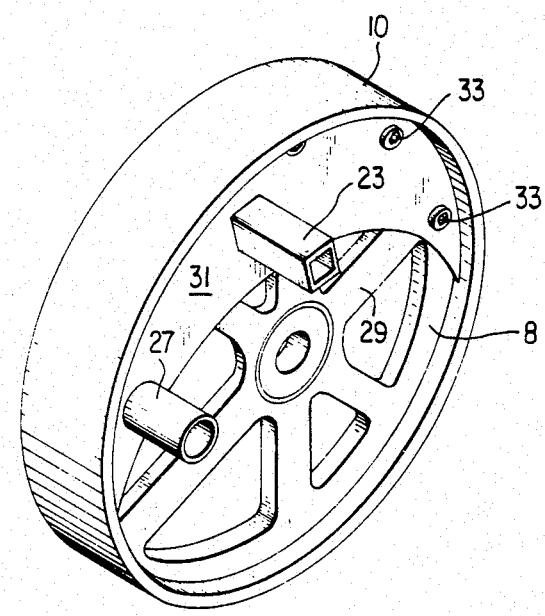
FIG. 5 is a perspective view of one of the ring assemblies of the tool of this invention.

Each receiving member 23 and pipe member 27 are mounted on the inner ring 8 with a plate 31 bolted to the inner ring with bolts 33. As illustrated in FIG. 3, when the inner ring is a sheave wheel, the plate is mounted by screwing the bolt into suitably tapped holes in the spokes 29. The receiving member 23 and the pipe member 27 are welded to the plate 31 in the spaced relation as illustrated in FIG. 5, and it is preferred that a portion 35,37 respectively of the receiving member 23 and pipe member 27 project through the plate 31 to provide better support for tube 21 and bar 25 when in operative engagement with each ring assembly 4,6.

Object engaging means 39 are mounted on the first connecting means 17 and liftingly engage the tool with a utility access cover 41 which is to be lifted by the tool. As seen more clearly in FIG. 3, the object engaging means 39 is in the form of a hook which hooks onto the tube 21 (see FIG. 1) and extends between the grating members of the utility access covers and engages with a lower surface 43 of the cover as seen more clearly in FIG. 3. Generally, the object engaging means 39 are hooked onto the tube 21, but they may also be hooked over the receiving members 23, as the spacing arrangement of the grid members of the utility access cover so dictate. To facilitate easy assembly of the tool over the cover 41, the object engaging means 39 are first engaged with the cover and then placed on the tube 21. This enables the ring assemblies 4,6 to be connected to the tube 21 by passing the tube 21 through the respective receiving member 23 without disturbing the position and orientation of the object engaging means 39 engaged with the cover.

Each hook 39 is provided with a hook saddle 40, preferably in the form of a half piece of tubing welded to the hook (see FIG. 1), to strengthen the hook, spread the lifting load over a broad surface and to reduce any tendency of the hook to straighten out during lifting and transporting of the cover. In addition, the hook saddle serves to prevent the hook from dropping through the grating, if inadvertently dropped by the operator, as well as during assembly or disassembly of the tool.

Lever means, generally referenced 45, are operatively engaged to the first and second connecting means 17,19 as illustrated in FIG. 3. As mentioned earlier, it is preferred to utilizing a tool as described in U.S. Pat. No. 4,227,731 suitably modified so that simultaneous engagement of the tool with the first and second connecting means 17,19 can be achieved. Each lever means 45 comprises a handle 47 having an arcuate end portion 49. An arcuate connector 51 is mounted on the arcuate portion 49 as illustrated in FIG. 3, and is positioned such that the arcuate connector 51 can be hooked over the bar 25 when the arcuate portion 49 is in engagement with an external surface of the tube 21. The tool of U.S. Pat. No. 4,227,731 also includes a hook arrangement 53 which is not required when the tool is being utilized as a handle for the present tool, and can be moved away from the first and second connecting means so that no interference occurs, as illustrated in FIG. 3. Thus, the modification which is effected to the lever means is the provision of the arcuate connector 51 on the arcuate portion 49 of the tool to facilitate bringing the lever means 45 into operative engagement with the first and second connecting means. In order to reduce the chances of inadvertent disengagement of arcuate connector 51 from the bar 25, the arcuate connector 51 is provided, about the mid portion thereof, with an indentation 55 which serves to increase the grip of the arcuate connector 51 on the bar 25.

It is possible to utilize, instead of an arcuate connector 51, a short piece of tubing which has an internal diameter such that the bar 25 is receivable through the tubing. The use of such a piece of tubing (not shown in the drawings) has the advantage that there is no chance of the lever means 45 becoming disengaged from the bar 25, but on the other hand it is necessary to preassemble the lever means 45 onto the bar 25 before the bar 25 is passed through the respective pipe members 27 in each ring assembly.

In operation of the tool, it is necessary, first, to assemble the tool over the utility access cover to be lifted. The first step in this procedure is to position the hooks 39 in the access cover and then to hook these over the tube 21. Each ring assembly 4,6 is then brought into engagement with the tube 21 by sliding the receiving members 23 onto each end of the tube 21. The bar 25 is then brought into engagement with the ring assemblies 4,6 by passing the bar through the pipe members 27 in each ring assembly 4,6. The lever means 45 are then connected as shown in FIG. 3, so that the arcuate connector 51 is hooked onto the bar 25 and the end of the arcuate portion 49 is engaged with the tube 21. Lifting of the cover is now effected by moving the lever means 45 in the direction of arrow A which urges the first and second connecting means 17,19 to rotate simultaneously with each other and thereby effect rotation of the inner rings 8 while the outer rings 10 remain essentially stationary. Lifting is completed when the configuration as shown in FIG. 2 is reached. This configuration is shown more clearly in FIG. 3 where the access cover 41 is shown in the raised position. With the tool in this configuration, it is now possible to transport the cover in the raised position by pulling or pushing on the lever means 45 to effect rotation of the outer ring members 10 relative to the inner ring members 8 and thereby roll the entire assembly away in any desired direction.

Lowering of the cover from the raised position to a lowered position is achieved by carefully permitting the lever means 45 to move in a direction indicated by arrows B in FIG. 2 so that the first and second connecting means 17,19 rotate away from the operator(s) and permit lowering of the cover to ground level, whereupon the tool again is in the configuration illustrated in FIG. 1.

The extent to which the cover is lifted by a tool of the invention will depend mainly on the diameter of the ring assemblies 4,6. It has been found that when a 10 inch outer ring and a 9 inch inner ring is employed, the vertical lift of the cover is about 5 to 7 inches. For utility covers, this is generally sufficient to lift the cover clear of the retaining frame and permit withdrawal of the cover. From this, it will be appreciated that it is possible to employ rings of any desired size, depending on the extent of lift required.

It is preferred to design the tool such that the extent to which the utility access cover is raised is sufficient to clear the ground without leaving enough space to allow the toes or feet of the operator(s) or any other person nearby to be trapped or mashed under the cover if it is released and descends to the ground.

Due to the presence of the second connecting means 19, the extent of flexing and bending of the first and second connecting means is substantially reduced over the instance where the tool comprises only a first connecting means, as described in the parent of the present application. It appears that the force exerted on the tool when the levers are moved in the direction of the arrow A to lift a cover is spread more evenly over the first and second connecting means as well as the ring assemblies due to the presence of the second connecting means, and as a result smoother lifting and maneuverability are achieved.

In an alternative embodiment, and not specifically disclosed in the drawings, it is possible to fabricate the plate 31 with a square shaped orifice and a circular orifice without a receiving member 23 and pipe member 27, so that the tube 21 and the bar 25 are receivable directly through these orifices in the plate. However, it will be appreciated that this arrangement does not provide the same degree of support to the tube 21 and the bar 25 as is achieved when receiving members 23 and pipe members 27 are present, and so this latter embodiment, while operable, is not as preferred as that described in detail above wherein each plate member 31 is provided with a receiving member 23 and a pipe member 27.

From the above description, it will be apparent that the tool of the invention offers significant advantages over prior tools which are currently employed to lift and maneuver utility access covers, and objects in general. In particular, the tool of the invention ensures controlled, safe handling of the object during lifting and maneuvering, and also has superior maneuverability and mechanical advantage, whereby the lifting of heavy covers and grantings can be achieved without the expenditure of excessive effort on the part of the operator.

What is claimed is:
1. A tool for vertically lifting and maneuvering objects, comprising:
   (a) support means having at least two axially spaced-apart ring assemblies defining an object receiving zone between said assemblies, each ring assembly having a center of rotation, each ring assembly including an inner and outer concentric ring member each independently rotatable with respect to the other, said inner ring member being at least partially axially within said outer ring member;
   (b) first connecting means for axially connecting together said spaced-apart ring assemblies, said first connecting means being operatively connected to a first receiving member mounted on each of said inner ring members at a first connection point;
   (c) second connecting means for axially connecting together said spaced-apart ring assemblies, said second connecting means being operatively connected to a second receiving member mounted on each of said inner ring members at a second connection point, said first and second connection points in each ring assembly being radially spaced from said center of rotation and being spaced from each other, said first and second connecting means being arranged in spaced parallel configuration with respect to each other;
   (d) object engaging means mountable on said first connecting means for connecting said first connecting means and said object together;
   (e) lever means operatively engageable with said first and second connecting means for rotating simultaneously said inner ring members, said lever means fulcruming about said second connecting means and urging said first connecting means to raise said object engaging means, said outer ring members remaining substantially stationary when said inner ring members are rotated;
said ring assemblies, first and second connecting means, and object engaging means cooperating to vertically lift said object into a raised position in said object receiving zone upon rotation of said inner ring members, said object being transportable in said raised position upon rotation of said outer ring members relative to said inner ring members.

2. A tool according to claim 1, wherein each first receiving member is an axially short pipe member of square cross-section and said first connecting means is an elongate tube of square cross-section receivable within each said axially short pipe member of square cross-section.

3. A tool according to claim 1, wherein each second receiving member is axially short pipe member of circular cross-section, and said second connecting means is a cylindrical rod receivable within each said axially short pipe member of circular cross-section.

4. A tool according to claim 1, wherein said lever means includes an arcuate connector connectible with said second connecting means, and an arcuate portion engageable with said first connecting means, said arcuate connector fulcruming about said second connecting means as said arcuate portion engages said first connecting means to raise said object engaging means.

5. A tool according to claim 1, wherein said inner ring members each have an outer circumferential surface and said outer ring members have an inner cylindrical surface, said outer circumferential surface of each said inner ring member and said inner surface of each said outer ring member defining an axial space in which is provided a plurality of equally radially spaced rolling means for allowing independent rotation of said inner and outer ring members with respect to each other.

6. A tool according to claim 5, wherein spacers are provided between each of said rolling means in order to maintain said rolling means equally radially spaced with respect to each other.

7. A tool according to claim 1, wherein a plate is mounted on each of said inner ring members, said plate defining an orifice of square configuration and an orifice of circular configuration spaced from said orifice of square configuration, said first receiving member comprising an elongate member of square cross-section which is receivable within said orifice of square cross-section, said second receiving member comprising an elongate member of circular cross-section being receivable within said orifice of circular cross-section.

8. A tool for vertically lifting and maneuvering utility access covers, comprising;

(a) support means having at least two axially spaced-apart ring assemblies defining an access cover receiving zone between said assemblies, each ring assembly having a center of rotation, each said ring assembly including an inner and outer concentric ring member, each ring member being independently rotatable with respect to the other, said inner ring member being at least partially axially within said outer ring member, each said inner ring member having affixed thereto a plate member defining therein a first orifice of square configuration and a second orifice of circular configuration, said first and second orifices being radially spaced from said center of rotation and being spaced from each other, said first orifice of square configuration having mounted therethrough an axially short pipe member of square cross-section and said second orifice of circular configuration having mounted therethrough an axially short tubular member of circular cross-section;

(b) first connecting means for axially connecting together said spaced-apart ring assemblies, said first connecting means comprising an elongate member of square cross-section receivable within said axially short member of square cross-section;

(c) second connecting means for axially connecting together said spaced-apart ring assemblies, said second connecting means comprising an elongate member of circular cross-section receivable within said axially short tubular member of circular cross-section;

(d) object engaging means mountable on said first connecting means for connecting said first connecting means and said utility access cover together;

(e) lever means operatively engagable with said first and second connecting means, said lever means comprising a handle at one end and having an arcuate portion at the other end thereof, said arcuate portion having affixed thereto an arcuate connector engagable with said elongate member of circular cross-section, said arcuate portion being engagable at a terminal point thereof with said elongate member of square cross-section so that when a force is applied to said handle to rotate said elongate member of square cross-section, said arcuate connector fulcrums about said elongate member of circular cross-section and said arcuate portion engages said elongate member of square cross-section at said terminal point to raise said object engaging means, said inner ring members being rotated simultaneously with respect to said outer ring members, said outer ring members remaining substantially stationary when said inner ring members are rotated;

said ring assemblies, first and second connecting means, and object engaging means cooperating to vertically lift said utility access cover into a raised position in said cover receiving zone upon rotation of said inner ring members, said cover being transportable in said raised position upon rotation of said outer ring members relative to said inner ring members.

* * * * *